United States Patent
Kim et al.

(10) Patent No.: US 12,325,120 B2
(45) Date of Patent: Jun. 10, 2025

(54) GAS CYLINDER TRANSFER APPARATUS AND GAS CYLINDER LOGISTICS SYSTEM INCLUDING THE SAME

(71) Applicant: SEMES CO., LTD., Cheonan-si (KR)

(72) Inventors: Tae Ho Kim, Cheonan-si (KR); Wang Hyeon Son, Cheonan-si (KR); Chong Whan Lee, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 996 days.

(21) Appl. No.: 17/379,412

(22) Filed: Jul. 19, 2021

(65) Prior Publication Data

US 2022/0016788 A1 Jan. 20, 2022

(30) Foreign Application Priority Data

Jul. 20, 2020 (KR) ........................ 10-2020-0089762

(51) Int. Cl.
*B25J 5/00* (2006.01)
*B25J 9/16* (2006.01)
*B25J 15/00* (2006.01)
*B25J 19/02* (2006.01)

(52) U.S. Cl.
CPC ........... *B25J 15/0038* (2013.01); *B25J 5/007* (2013.01); *B25J 9/1697* (2013.01); *B25J 19/023* (2013.01)

(58) Field of Classification Search
CPC ...... B25J 15/0038; B25J 19/023; B25J 5/007; B25J 9/1697; B25J 15/08; B25J 15/083; B25J 9/1612
USPC .............................................. 294/86.4, 102.1
See application file for complete search history.

(56) References Cited

U.S. PATENT DOCUMENTS

| | | | | | |
|---|---|---|---|---|---|
| 2,905,347 | A | * | 9/1959 | Hopfeld .................. | B66F 9/187 414/622 |
| 4,021,070 | A | * | 5/1977 | Shea ....................... | B66F 19/00 414/547 |
| 6,086,312 | A | * | 7/2000 | Ziaylek .................... | B60P 7/12 414/917 |
| D632,450 | S | * | 2/2011 | Agoncillo ...................... | D34/28 |
| 8,382,419 | B2 | * | 2/2013 | Agoncillo ................. | B66F 9/18 414/910 |
| D752,838 | S | * | 3/2016 | Ziaylek .......................... | D34/28 |
| 9,388,029 | B2 | * | 7/2016 | Ziaylek .................... | B65G 7/00 |
| 9,994,435 | B2 | * | 6/2018 | Hasler ....................... | B66F 9/10 |
| 11,564,853 | B1 | * | 1/2023 | Delise .................... | A61G 3/008 |

(Continued)

FOREIGN PATENT DOCUMENTS

| | | |
|---|---|---|
| CN | 209905646 | 1/2020 |
| JP | 2005-219912 | 8/2005 |
| WO | 2019/163378 | 8/2019 |

OTHER PUBLICATIONS

Korean Office Action with English translation for Korean Patent Application No. 10-2020-0089762, dated May 19, 2023.

*Primary Examiner* — Paul T Chin
(74) *Attorney, Agent, or Firm* — KILE PARK REED & HOUTTEMAN PLLC

(57) ABSTRACT

A gas cylinder transfer apparatus and a gas cylinder logistics system including the same are disclosed. The gas cylinder transfer apparatus includes a transfer vehicle for transferring a gas cylinder and a transfer robot disposed on the transfer vehicle. The transfer robot includes a robot hand for supporting a lower surface portion of the gas cylinder and a hand drive unit for moving the robot hand in horizontal and vertical directions.

19 Claims, 6 Drawing Sheets

(56) References Cited

U.S. PATENT DOCUMENTS

| | | | |
|---|---|---|---|
| 2007/0292247 A1* | 12/2007 | Wilson | B62B 3/104 |
| | | | 24/69 ST |
| 2007/0292249 A1* | 12/2007 | Wilson | B62B 5/0003 |
| | | | 414/444 |
| 2010/0263967 A1 | 10/2010 | Agoncillo et al. | |
| 2017/0274904 A1* | 9/2017 | Koide | B60W 50/10 |

* cited by examiner

GAS CYLINDER TRANSFER APPARATUS AND GAS CYLINDER LOGISTICS SYSTEM INCLUDING THE SAME

CROSS-REFERENCE TO RELATED APPLICATION

This application claims the priority benefit of Korean Patent Application No. 10-2020-0089762, filed on Jul. 20, 2020, and all the benefits accruing therefrom under 35 U.S.C. § 119, the contents of which are incorporated by reference in their entirety.

TECHNICAL FIELD

The present disclosure relates to a gas cylinder transfer apparatus and a gas cylinder logistics system including the same. More specifically, the present disclosure relates to a gas cylinder transfer apparatus for transferring a gas cylinder used to supply a process gas in a semiconductor device manufacturing process and a gas cylinder logistics system including the same.

BACKGROUND

In general, semiconductor devices may be manufactured by repeatedly performing a series of manufacturing processes on a silicon wafer used as a substrate. The semiconductor devices may be individualized by a dicing process and may be manufactured into semiconductor packages by a die bonding process and a packaging process.

Various types of process gases may be supplied to the processes for manufacturing the semiconductor devices. The process gases may be supplied to process apparatuses in a state stored in cylinder-shaped storage containers, and gas cylinders for supplying the process gases may be stored and managed by a separate storage apparatus. However, since the automation for the transfer and storage of the gas cylinders is not sufficient, the transfer and storage of the gas cylinders are performed manually by an operator. Therefore, there is a possibility that an accident may occur while the gas cylinders are transferred, and a countermeasure for this is required.

SUMMARY

The embodiments of the present invention provide a gas cylinder transfer apparatus for transferring a gas cylinder and a gas cylinder logistics system including the same.

In accordance with an aspect of the present invention, a gas cylinder transfer apparatus may include a transfer vehicle configured to transfer a gas cylinder, and a transfer robot disposed on the transfer vehicle. The transfer robot may include a robot hand configured to support a lower surface portion of the gas cylinder, and a hand drive unit configured to move the robot hand in horizontal and vertical directions.

In accordance with some embodiments of the present invention, the hand drive unit may include a first horizontal drive part configured to move the robot hand in a front-rear direction of the transfer vehicle, a second horizontal drive part configured to move the robot hand in a left-right direction of the transfer vehicle, and a vertical drive part configured to move the robot hand in a vertical direction.

In accordance with some embodiments of the present invention, the hand drive unit may include a tilt drive part configured to adjust an inclination of the robot hand so that an upper portion of the gas cylinder is inclined backward after the gas cylinder is supported on the robot hand.

In accordance with some embodiments of the present invention, the transfer robot may include a gripper unit configured to grip both side portions of the gas cylinder supported on the robot hand.

In accordance with some embodiments of the present invention, the robot hand may include a support member extending a front-rear direction of the transfer vehicle and configured to support the lower surface portion of the gas cylinder, and a hand bracket extending in a direction perpendicular to the support member from a rear portion of the support member.

In accordance with some embodiments of the present invention, the gripper unit may be mounted on the hand bracket.

In accordance with some embodiments of the present invention, the gas cylinder transfer apparatus may further include a camera unit mounted on the robot hand and configured to detect a stage on which the gas cylinder is placed.

In accordance with some embodiments of the present invention, the gas cylinder transfer apparatus may further include a distance sensor mounted on the robot hand and configured to measure a distance from a stage on which the gas cylinder is placed.

In accordance with another aspect of the present invention, a gas cylinder logistics system may include a gas cylinder transfer apparatus comprising a transfer vehicle configured to transfer a gas cylinder and a transfer robot disposed on the transfer vehicle, and a gas cylinder storage apparatus configured to store the gas cylinder transferred by the gas cylinder transfer apparatus. The transfer robot may include a robot hand configured to support a lower surface portion of the gas cylinder, and a hand drive unit configured to move the robot hand in horizontal and vertical directions.

In accordance with some embodiments of the present invention, the gas cylinder storage apparatus may include a stage configured to support the gas cylinder.

In accordance with some embodiments of the present invention, the robot hand may include a support member extending a front-rear direction of the transfer vehicle and configured to support the lower surface portion of the gas cylinder, and the stage may include support blocks configured to support both side portions of a lower surface of the gas cylinder.

In accordance with some embodiments of the present invention, the gas cylinder transfer apparatus may further include a camera unit mounted on the robot hand and configured to detect the support blocks.

In accordance with some embodiments of the present invention, alignment marks for alignment between the robot hand and the support blocks may be respectively disposed on front portions of the support blocks.

In accordance with some embodiments of the present invention, a recognition code in which information of the stage is stored may be attached to a front portion of the stage, and a code reader configured to read the recognition code may be mounted on the robot hand.

In accordance with some embodiments of the present invention, QR codes in which information of the stage is stored may be respectively attached to front portions of the support blocks, and a camera unit for reading the QR codes may be mounted on the robot hand.

In accordance with some embodiments of the present invention, the gas cylinder transfer apparatus may further include distance sensors mounted on the robot hand and configured to measure distances from the support blocks, respectively.

In accordance with some embodiments of the present invention, the gas cylinder transfer apparatus may further include a tilt sensor mounted on the robot hand and configured to measure a tilt of the support member.

In accordance with some embodiments of the present invention, the hand drive unit may include a first horizontal drive part configured to move the robot hand in a front-rear direction of the transfer vehicle, a second horizontal drive part mounted on the first horizontal drive part and configured to move the robot hand in a left-right direction of the transfer vehicle, a vertical drive part mounted on the second horizontal drive part and configured to move the robot hand in a vertical direction, and a tilt drive part mounted on the vertical drive part and configured to adjust an inclination of the robot hand so that an upper portion of the gas cylinder is inclined backward after the gas cylinder is supported on the robot hand.

In accordance with some embodiments of the present invention, the gas cylinder transfer apparatus may further include a gripper unit configured to grip both side portions of the gas cylinder supported on the robot hand.

In accordance with still another aspect of the present invention, a gas cylinder logistics system may include a gas cylinder transfer apparatus comprising a transfer vehicle configured to transfer a gas cylinder and a transfer robot disposed on the transfer vehicle, and a gas cylinder storage apparatus configured to store the gas cylinder transferred by the gas cylinder transfer apparatus. The gas cylinder storage apparatus may include a stage configured to support the gas cylinder, and the transfer robot may include a robot hand configured to support a lower surface portion of the gas cylinder, a hand drive unit configured to move the robot hand in horizontal and vertical directions, and a camera unit mounted on the robot hand and configured to detect the stage.

The above summary of the invention is not intended to describe each illustrated embodiment or every implementation of the present invention. The detailed description and claims that follow more particularly exemplify these embodiments.

BRIEF DESCRIPTION OF THE DRAWINGS

Embodiments of the present invention can be understood in more detail from the following description taken in conjunction with the accompanying drawings, in which.

Figure 1:
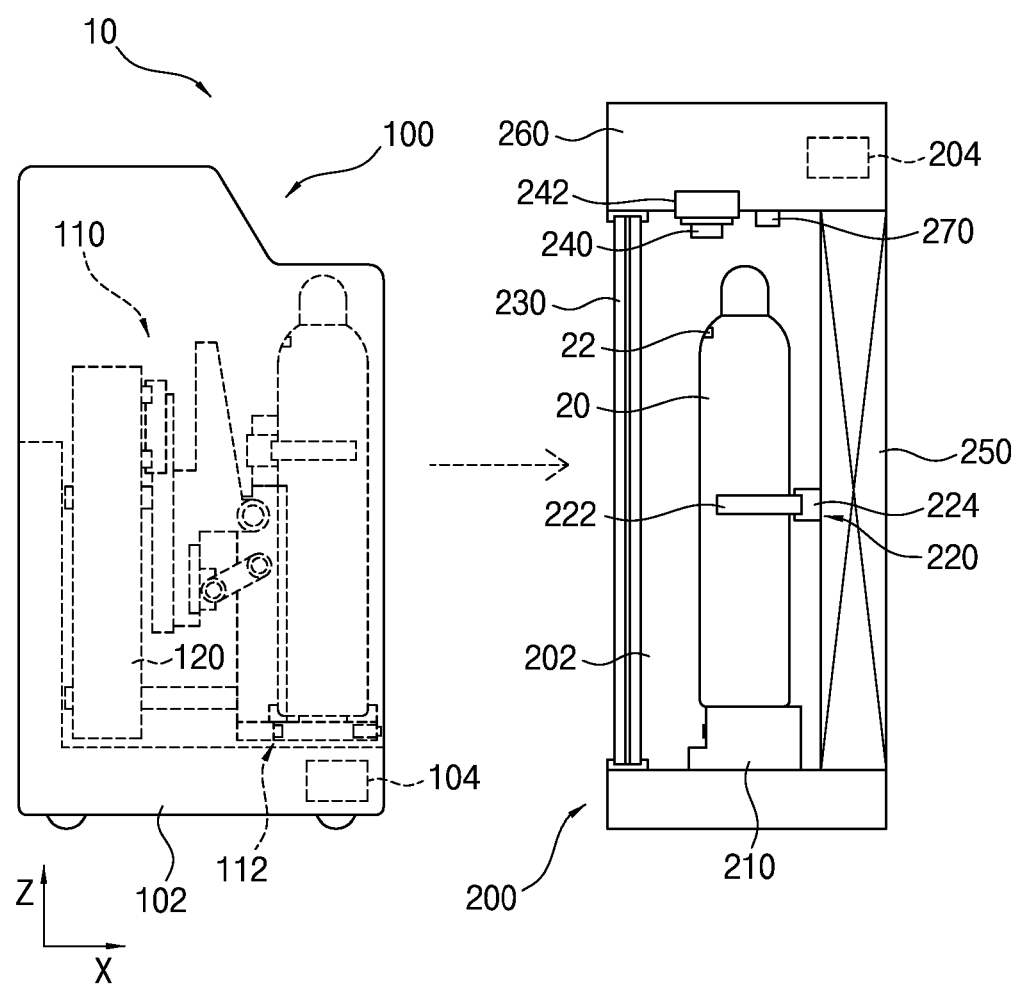
FIG. 1 is a schematic side view illustrating a gas cylinder transfer apparatus and a gas cylinder logistics system including the same in accordance with an embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Hereinafter, embodiments of the present invention are described in more detail with reference to the accompanying drawings. However, the present invention is not limited to the embodiments described below and is implemented in various other forms. Embodiments below are not provided to fully complete the present invention but rather are provided to fully convey the range of the present invention to those skilled in the art.

In the specification, when one component is referred to as being on or connected to another component or layer, it can be directly on or connected to the other component or layer, or an intervening component or layer may also be present. Unlike this, it will be understood that when one component is referred to as directly being on or directly connected to another component or layer, it means that no intervening component is present. Also, though terms like a first, a second, and a third are used to describe various regions and layers in various embodiments of the present invention, the regions and the layers are not limited to these terms.

Terminologies used below are used to merely describe specific embodiments, but do not limit the present invention. Additionally, unless otherwise defined here, all the terms including technical or scientific terms, may have the same meaning that is generally understood by those skilled in the art.

Embodiments of the present invention are described with reference to schematic drawings of ideal embodiments. Accordingly, changes in manufacturing methods and/or allowable errors may be expected from the forms of the drawings. Accordingly, embodiments of the present invention are not described being limited to the specific forms or areas in the drawings, and include the deviations of the forms. The areas may be entirely schematic, and their forms may not describe or depict accurate forms or structures in any given area, and are not intended to limit the scope of the present invention.

FIG. 1 is a schematic side view illustrating a gas cylinder transfer apparatus and a gas cylinder logistics system including the same in accordance with an embodiment of the present invention.

Referring to FIG. 1, a gas cylinder transfer apparatus 100, in accordance with an embodiment of the present invention, may be used to transfer a gas cylinder 20 for supplying a process gas in a manufacturing process of a semiconductor device or a display device. Further, a gas cylinder logistics system 10, in accordance with an embodiment of the present invention, may include the gas cylinder transfer apparatus 100 and a gas cylinder storage apparatus 200 for storing the gas cylinder 20.

In accordance with an embodiment of the present invention, the gas cylinder transfer apparatus 100 may include a transfer vehicle 102 for transferring the gas cylinder 20 and a transfer robot 110 disposed on the transfer vehicle 102. Particularly, the transfer robot 110 may include a robot hand 112 for supporting a lower surface portion of the gas cylinder 20 and a hand drive unit 120 for moving the robot hand 112 in horizontal and vertical directions.

Figure 2:
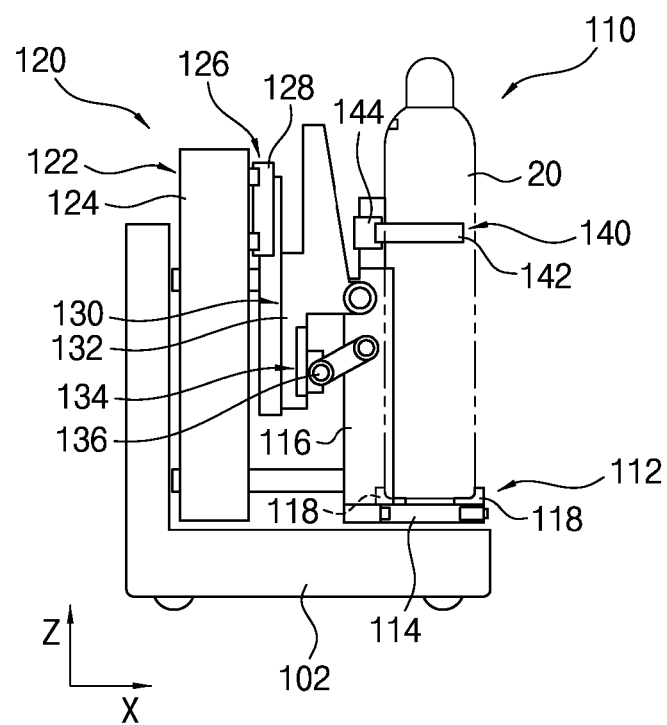
FIG. 2 is a schematic side view illustrating a transfer robot as shown in FIG. 1.
Figure 3:
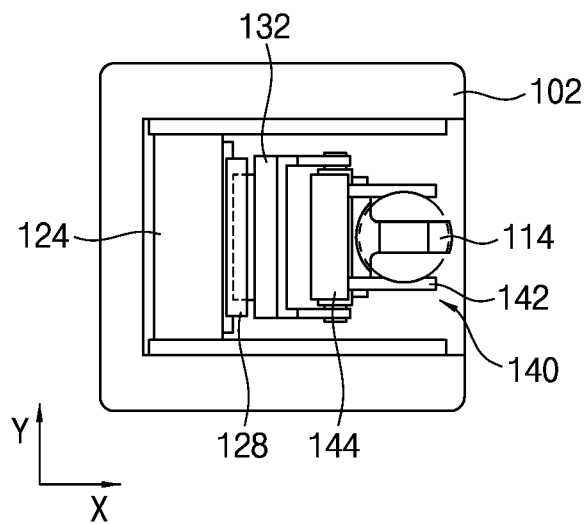
FIG. 3 is a schematic plan view illustrating the transfer robot as shown in FIG. 1.

FIG. 2 is a schematic side view illustrating the transfer robot 110 as shown in FIG. 1, and FIG. 3 is a schematic plan view illustrating the transfer robot 110 as shown in FIG. 1.

Referring to FIGS. 2 and 3, the robot hand 112 may include a support member 114 extending a front-rear direction of the transfer vehicle 102 and for supporting the lower surface portion of the gas cylinder 20, and a hand bracket 116 extending in a direction perpendicular to the support member 114 from a rear portion of the support member 114. For example, the support member 114 may extend in an X-axis direction, and the hand bracket 116 may extend in a Z-axis direction. Particularly, support pads 118 for supporting the gas cylinder 20 may be respectively disposed on front and rear portions of the support member 114.

The hand drive unit 120 may include a first horizontal drive part 122 for moving the robot hand 112 in the front-rear direction of the transfer vehicle 102, a second horizontal drive part 126 for moving the robot hand 112 in a left-right direction of the transfer vehicle 102, for example, in a Y-axis direction, and a vertical drive part 130 for moving the robot hand 112 in a vertical direction, that is, in the Z-axis direction. For example, the first horizontal drive part 122 may include a first movable member 124 mounted on the transfer vehicle 102 to be movable in the front-rear direction, and the second horizontal drive part 126 may include a second movable member 128 mounted on the first movable member 124 to be movable in the left-right direction. Further, the vertical drive part 130 may include a vertical movable member 132 mounted on the second movable member 128 to be movable in the vertical direction.

Figure 4:
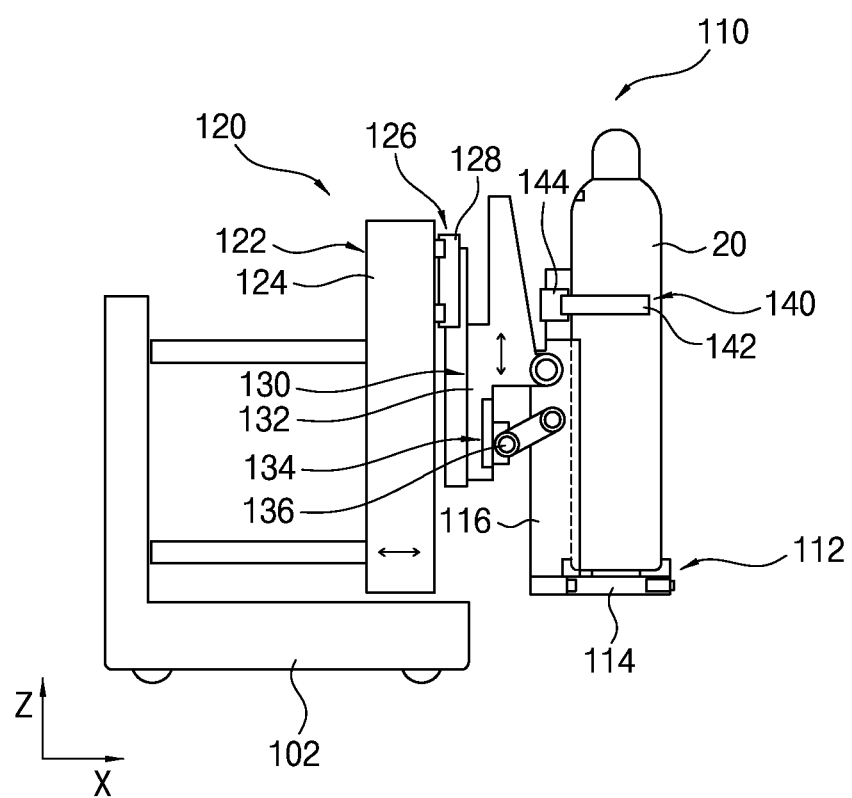
FIGS. 4 to 6 are schematic side views illustrating operations of the transfer robot as shown in FIG. 2.
Figure 5:
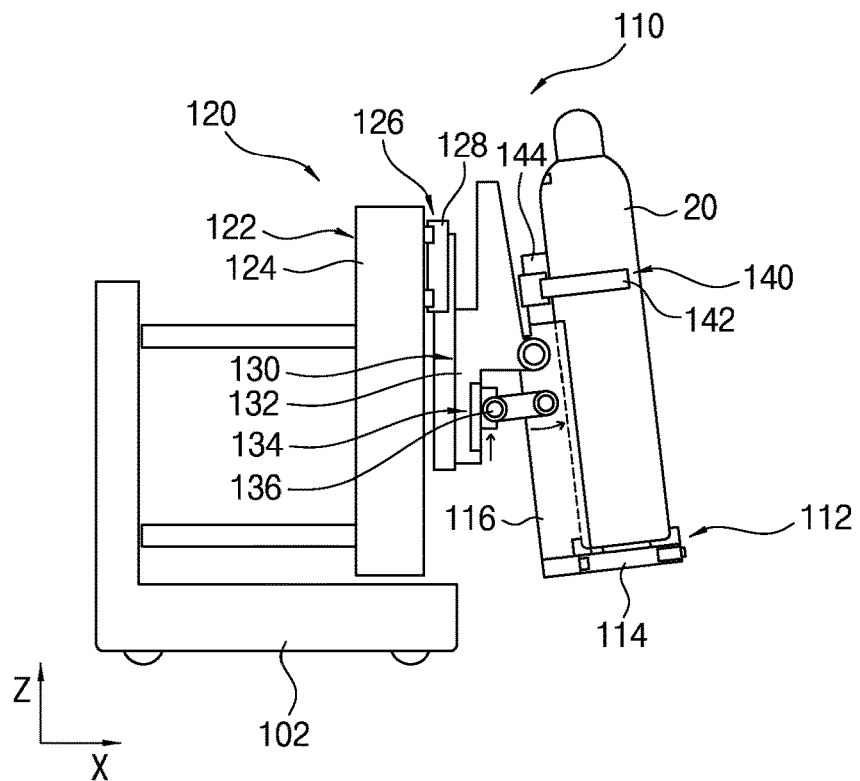
Figure 6:
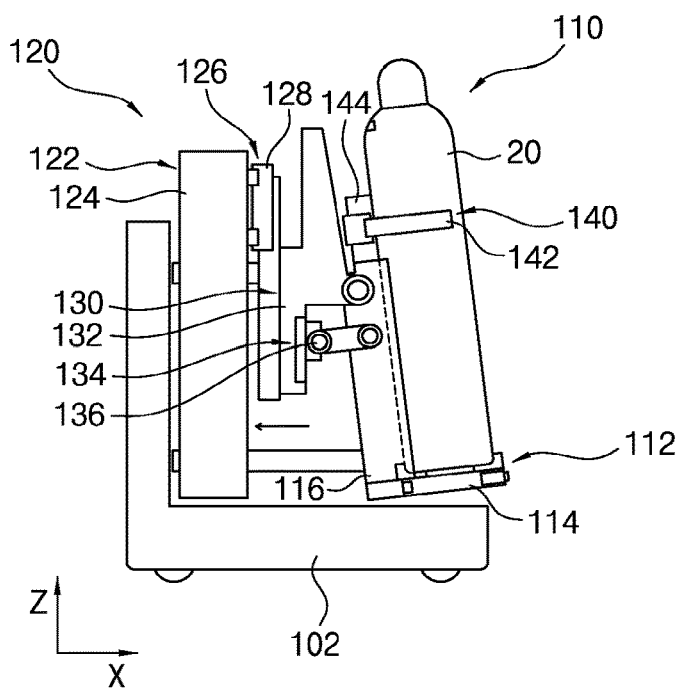

FIGS. 4 to 6 are schematic side views illustrating operations of the transfer robot 110 as shown in FIG. 2.

Referring to FIGS. 4 to 6, the hand drive unit 120 may move the robot hand 112 in the horizontal and vertical directions in order to pick up the gas cylinder 20. Particularly, in accordance with an embodiment of the present invention, the transfer robot 110 may include a gripper unit 140 for gripping both side portions of the gas cylinder 20 supported on the robot hand 112.

The gripper unit 140 may be mounted on the hand bracket 116, and may include a pair of gripper members 142 for gripping the both side portions of the gas cylinder 20 and a gripper drive part 144 for operating the gripper members 142. The gripper members 142 may be disposed to face each other, and may move toward each other and away from each other by the gripper drive part 144. Although not shown, the gripper drive part 144 may include rack gears (not shown) connected to the gripper members 142 and a pinion gear (not shown) engaged with the rack gears between the rack gears.

The gripper unit 140 may grip both side portions of the gas cylinder 20 to prevent the gas cylinder 20 from falling while the gas cylinder 20 is being transferred. Further, in accordance with an embodiment of the present invention, the hand drive unit 120 may include a tilt drive part 134 for adjusting an inclination of the robot hand 112 so that an upper portion of the gas cylinder 20 is inclined backward after the gas cylinder 20 is supported on the robot hand 112.

For example, the hand bracket 116 of the robot hand 112 may be rotatably mounted to the vertical movable member 132 through a rotation shaft. The tilt drive part 134 may be mounted on the vertical movable member 132, and may include a link member 136 connected to the hand bracket 116. Further, the tilt drive part 134 may move the link member 136 in the vertical direction to adjust the inclination of the robot hand 112 as shown in FIG. 5. As another example, the tilt drive part 134 may adjust the inclination of the robot hand 112 using a pneumatic cylinder.

As described above, the tilt drive part 134 may adjust the inclination of the robot hand 112 so that the upper portion of the gas cylinder 20 is inclined backward at a predetermined angle, and thus the gas cylinder 20 may be prevented from being separated from the robot hand 112.

Figure 7:
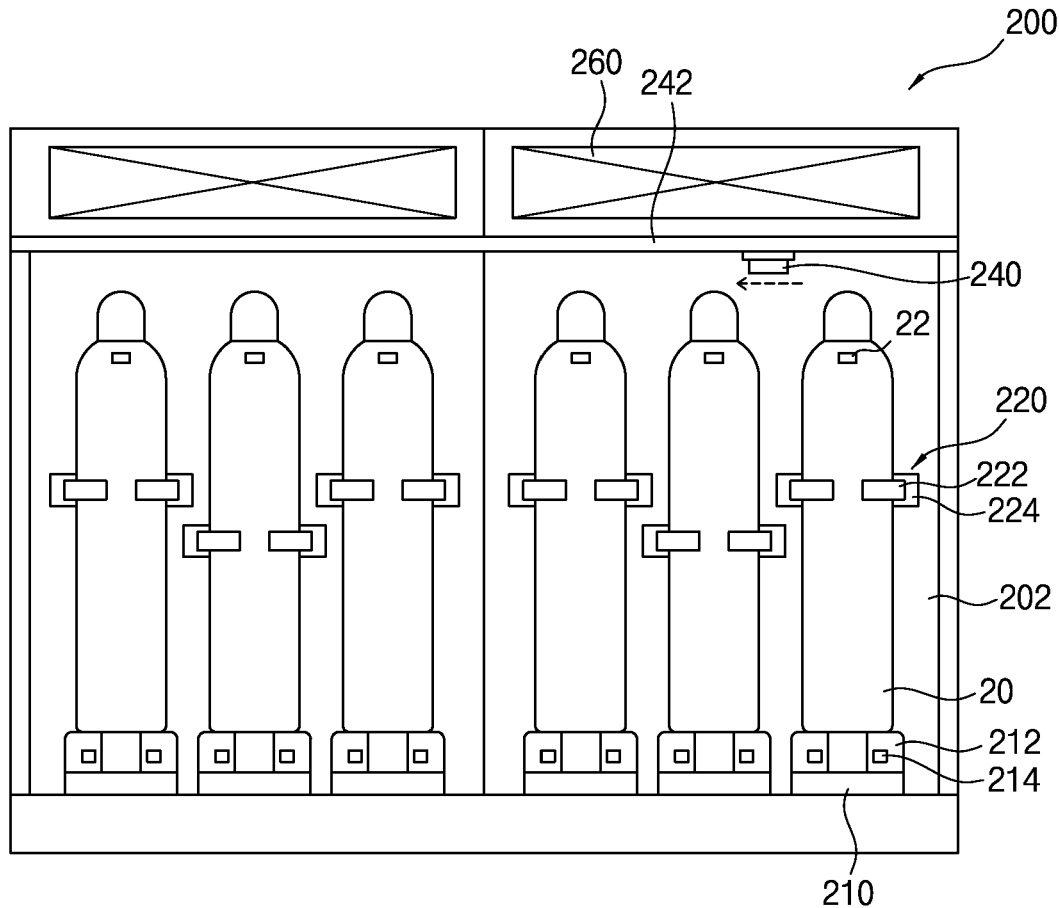
FIG. 7 is a schematic front view illustrating a gas cylinder storage apparatus as shown in FIG. 1.

FIG. 7 is a schematic front view illustrating the gas cylinder storage apparatus 200 as shown in FIG. 1.

Referring to FIGS. 1 and 7, the gas cylinder storage apparatus 200 may include a storage chamber 202 having an interior space for storing gas cylinders 20, stages 210 disposed in the storage chamber 202 and for supporting the gas cylinders 20, and second gripper units 220 disposed in the storage chamber 202 and for gripping the gas cylinders 20. Each of the second gripper units 220 may include second gripper members 222 for gripping both side portions of the gas cylinder 20, and a second gripper drive part 224 for operating the second gripper members 222.

The gas cylinder storage apparatus 200 may include doors 230 provided on a front portion of the storage chamber 202 to open and close the storage chamber 202. Particularly, when the gas cylinder transfer apparatus 100 approaches the storage chamber 202 to accommodate or take out the gas cylinder 20, one of the doors 230 facing the gas cylinder transfer apparatus 100 may be opened by a door drive unit (not shown).

Information tags 22 in which history information of the gas cylinders 20 are stored may be attached to the gas cylinders 20, respectively. For example, the information tags 22 may store a series of information such as a material code indicating the gas material stored in each gas cylinder 20, a manufacturing number, the purity of the filling gas, a manufacturing date, an expiration date, etc., and an information acquisition unit 240 for acquiring the history information from the information tags 22 of the gas cylinders 20 may be provided in the storage chamber 202.

For example, a barcode may be attached to the gas cylinder 20, and in this case, a barcode reader for reading information of the barcode may be provided in the storage chamber 202. As another example, a Quick Response (QR) code may be attached to the gas cylinder 20, and in this case, a QR code reader may be provided in the storage chamber 202.

In accordance with an embodiment of the present invention, the gas cylinder storage apparatus 200 may include a horizontal drive unit 242 for moving the information acquisition unit 240 in a horizontal direction so that the information acquisition unit 240 is adjacent to the information tags 22. For example, the information tags 22 may be attached to upper portions of the gas cylinders 20, and the information acquisition unit 240 may be horizontally moved above the gas cylinders 20 by the horizontal drive unit 242.

A temperature in the storage chamber 202 may be constantly maintained at a predetermined temperature to prevent gas leakage from the gas cylinders 20. The gas cylinder storage apparatus 200 may include a temperature control unit 250 for maintaining the temperature in the storage chamber 202 at the predetermined temperature. For example, the temperature control unit 250 may include a temperature sensor (not shown) for measuring the temperature in the storage chamber 202, and a heater (not shown) and a cooler (not shown) for adjusting the temperature in the storage chamber 202.

Further, though not shown in figures, the gas cylinder storage apparatus 200 may include sealing members (not shown) disposed between the doors 230 and between the storage chamber 202 and the doors 230 in order to seal the inside of the storage chamber 202. Particularly, when gas leaks from the gas cylinders 20, the inside of the storage chamber 202 may be preferably maintained at a negative pressure lower than atmospheric pressure so that the leaked gas does not leak to the outside of the storage chamber 202.

In accordance with an embodiment of the present invention, the gas cylinder storage apparatus 200 may include a pressure control unit 260 for maintaining the pressure inside the storage chamber 202 at a predetermined pressure. The pressure control unit 260

The pressure control unit 260 may maintain the internal pressure of the storage chamber 202 at a negative pressure lower than atmospheric pressure in order to prevent gas leakage. That is, the pressure control unit 260 may maintain the internal pressure of the storage chamber 202 lower than the external pressure. For example, a fan filter unit may be disposed above the storage chamber 202, and when gas leaks from the gas cylinders 20, the leaked gas may be removed by the fan filter unit. In this case, the fan filter unit may be connected to an apparatus such as a gas scrubber for gas purification. As another example, the storage chamber 202 may be connected to a vacuum source such as a vacuum pump or vacuum ejector, and air and gas discharged from the storage chamber 202 by the vacuum source may be purified by the gas scrubber and then discharged to the outside.

Further, the gas cylinder storage apparatus 200 may include a gas sensor 270 disposed in the storage chamber 202 to detect a gas leak in the storage chamber 202, and a control unit 204 that determines whether gas is leaking according to an output signal of the gas sensor 270 and generates an alarm signal to notify a user when gas leaks from the gas cylinders 20. The control unit 204 may discharge the leaked gas through the pressure control unit 260, and may control operations of the door drive unit so that the doors 230 are not opened until all of the gas leaked into the storage chamber 202 is removed.

Figure 8:
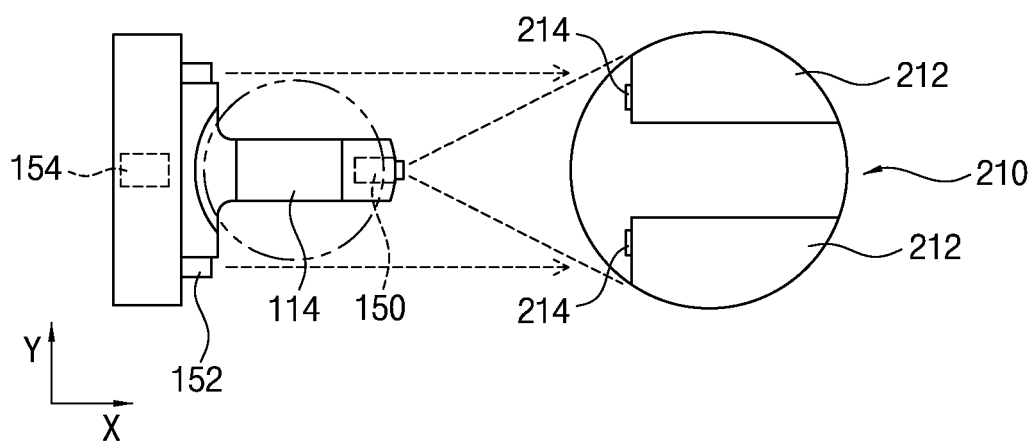
FIG. 8 is a schematic enlarged plan view illustrating a support member of a robot hand as shown in FIG. 2 and a stage as shown in FIG. 7.
Figure 9:
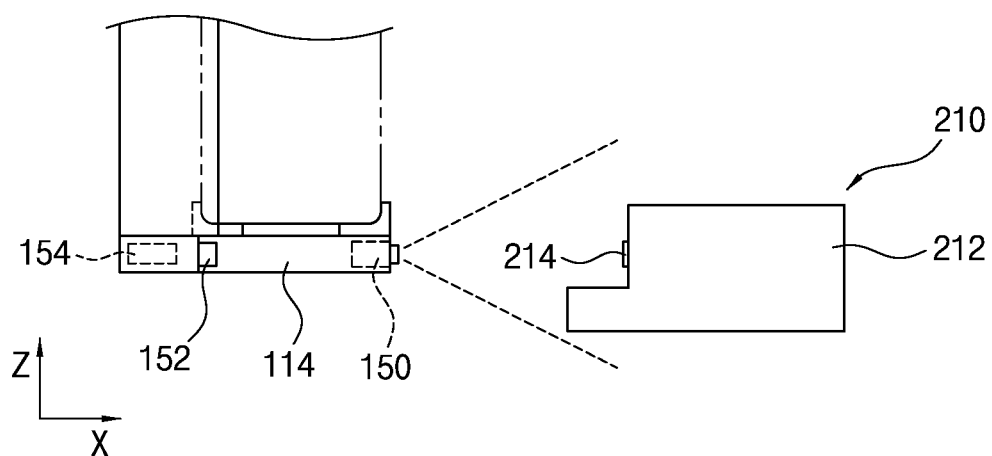
FIG. 9 is a schematic enlarged side view illustrating the support member of the robot hand and the stage as shown in FIG. 8.

FIG. 8 is a schematic enlarged plan view illustrating the support member 114 of the robot hand 112 as shown in FIG. 2 and the stage 210 as shown in FIG. 7, and FIG. 9 is a schematic enlarged side view illustrating the support member 114 of the robot hand 112 and the stage 210 as shown in FIG. 8.

Referring to FIGS. 8 and 9, the support member 114 may extend the front-rear direction of the transfer vehicle 102, and the stage 210 may include support blocks 212 for supporting both side portions of a lower surface of the gas cylinder 20. For example, when the gas cylinder 20 is loaded on the stage 210, the first horizontal drive part 122 may advance the support member 114 and the vertical drive part 130 may then lower the support member 114 between the support blocks 212 to place the gas cylinder 20 on the support blocks 212. Further, when unloading the gas cylinder 20 from the stage 210, the first horizontal drive part 122 may advance the support member 114 between the support blocks 212 and the vertical drive part 130 may then move the support member 114 upward to pick up the gas cylinder 20.

In accordance with an embodiment of the present invention, the gas cylinder transfer apparatus 100 may include a camera unit 150 mounted on the robot hand 112 and for detecting the support blocks 212 of the stage 210. For example, the camera unit 150 may be mounted on a front portion of the support member 114.

Particularly, alignment marks for alignment between the support member 114 of the robot hand 112 and the support blocks 212 of the stage 210 may be attached on front portions of the support blocks 212 facing the support member 114 of the robot hand 112, respectively. For example, QR codes 214 storing information of the stage 210 may be attached to the front portions of the support blocks 212, respectively. In such case, the QR codes 214 may be used as alignment marks for alignment between the support member 114 and the support blocks 212, and the camera unit 150 may be used as a QR code reader for reading the QR codes 214.

Further, distance sensors 152 for measuring distances from the support blocks 212, respectively, may be mounted on the robot hand 112. For example, laser distance sensors 152 may be mounted on both sides of the support member 114, respectively, and the distances between the robot hand 112 and the support blocks 212 may be measured by the laser distance sensors 152.

In accordance with an embodiment of the present invention, the gas cylinder transfer apparatus 100 may include a control unit 104 for controlling operations of the transfer vehicle 102 and the transfer robot 110. The control unit 104 may adjust position and angle of the transport vehicle 102 so that distance values measured by the distance sensors 152 are equal to each other, that is, so that the support member 114 of the robot hand 112 faces the support blocks 212 of the stage 210 in front. In addition, the camera unit 150 may acquire an image including the QR codes 214, and the control unit 104 may detect position coordinates of the QR codes 214 from the image, and may control operations of the second horizontal drive part 126 so that the support member 114 of the robot hand 112 is positioned between the support blocks 212.

Further, the control unit 104 may control operations of the tilt drive part 134. Specifically, when the gas cylinder 20 is loaded onto the stage 210 or unloaded from the stage 210, the control unit 104 may control the operations of the tilt drive part 134 so that the support member 114 is in a horizontal state. Particularly, a tilt sensor 154 for measuring a tilt of the support member 114 may be mounted on the robot hand 112, and the control unit 104 may adjust the inclination of the support member 114 based on measurement signals from the tilt sensor 154.

Still further, the control unit 104 of the gas cylinder transfer apparatus 100 may be configured to be capable of wireless communication with the control unit 204 of the gas cylinder storage apparatus 200. After the gas cylinder transfer apparatus 100 arrives at the front of the gas cylinder storage apparatus 200, the control unit 204 of the gas cylinder storage apparatus 200 may open one of the doors 230 according to a door open signal transmitted from the control unit 104 of the gas cylinder transfer apparatus 100.

In accordance with the embodiments of the present invention as described above, the gas cylinder transfer apparatus 100 may transfer the gas cylinder using the transfer vehicle 102 and the transfer robot 110, and the gas cylinder storage apparatus 200 may store the gas cylinder 20 transferred by the gas cylinder transfer apparatus 100. As described above, the transfer and storage of the gas cylinder 20 may be automated by the gas cylinder transfer apparatus 100 and the gas cylinder storage apparatus 200, and thus accidents that may occur in the process of transferring and storing the gas cylinder 20 may be significantly reduced.

Although the example embodiments of the present invention have been described with reference to the specific embodiments, they are not limited thereto. Therefore, it will be readily understood by those skilled in the art that various modifications and changes can be made thereto without departing from the spirit and scope of the appended claims.

The invention claimed is:

1. A gas cylinder transfer apparatus comprising:
a transfer vehicle configured to transfer a gas cylinder; and
a transfer robot disposed on the transfer vehicle; and
a control unit configured to control operations of the transfer vehicle and the transfer robot,
wherein the transfer robot comprises:
a robot hand configured to support a lower surface portion of the gas cylinder; and
a hand drive unit configured to move the robot hand in horizontal and vertical directions,
wherein the hand drive unit comprises:
a tilt drive part configured to adjust an inclination of the robot hand so that an upper portion of the gas cylinder is inclined backward after the gas cylinder is supported on the robot hand,
wherein the control unit is further configured to control operations of the tilt drive part, such that, when the gas cylinder is loaded onto a stage or unloaded from the stage, the control unit controls the operations of the tilt drive part so that a support member is in a horizontal state, and
wherein a tilt sensor configured to measure a tilt of the support member is mounted on the robot hand, and the control unit is configured to adjust the inclination of the support member based on measurement signals received from the tilt sensor.

2. The gas cylinder transfer apparatus of claim 1, wherein the hand drive unit comprises:
a first horizontal drive part configured to move the robot hand in a front-rear direction of the transfer vehicle;
a second horizontal drive part configured to move the robot hand in a left-right direction of the transfer vehicle; and
a vertical drive part configured to move the robot hand in a vertical direction.

3. The gas cylinder transfer apparatus of claim 1, wherein the transfer robot further comprises:
a gripper unit configured to grip both side portions of the gas cylinder supported on the robot hand.

4. The gas cylinder transfer apparatus of claim 3, wherein the robot hand comprises:
a support member extending a front-rear direction of the transfer vehicle and configured to support the lower surface portion of the gas cylinder; and
a hand bracket extending in a direction perpendicular to the support member from a rear portion of the support member.

5. The gas cylinder transfer apparatus of claim 4, wherein the gripper unit is mounted on the hand bracket.

6. The gas cylinder transfer apparatus of claim 1, further comprising:
a camera unit mounted on the robot hand and configured to detect a stage on which the gas cylinder is placed.

7. The gas cylinder transfer apparatus of claim 1, further comprising:
a distance sensor mounted on the robot hand and configured to measure a distance from a stage on which the gas cylinder is placed.

8. A gas cylinder logistics system comprising:
a gas cylinder transfer apparatus comprising a transfer vehicle configured to transfer a gas cylinder and a transfer robot disposed on the transfer vehicle;
a control unit configured to control operations of the transfer vehicle and the transfer robot; and
a gas cylinder storage apparatus configured to store the gas cylinder transferred by the gas cylinder transfer apparatus,
wherein the transfer robot comprises:
a robot hand configured to support a lower surface portion of the gas cylinder; and
a hand drive unit configured to move the robot hand in horizontal and vertical directions,
wherein the hand drive unit comprises:
a tilt drive part configured to adjust an inclination of the robot hand so that an upper portion of the gas cylinder is inclined backward after the gas cylinder is supported on the robot hand,
wherein the control unit is further configured to control operations of the tilt drive part, such that, when the gas cylinder is loaded onto a stage or unloaded from the stage, the control unit controls the operations of the tilt drive part so that a support member is in a horizontal state, and
wherein a tilt sensor configured to measure a tilt of the support member is mounted on the robot hand, and the control unit is configured to adjust the inclination of the support member based on measurement signals received from the tilt sensor.

9. The gas cylinder logistics system of claim 8, wherein the gas cylinder storage apparatus comprises a stage configured to support the gas cylinder.

10. The gas cylinder logistics system of claim 9, wherein the robot hand comprises a support member extending a front-rear direction of the transfer vehicle and configured to support the lower surface portion of the gas cylinder, and the stage comprises support blocks configured to support both side portions of a lower surface of the gas cylinder.

11. The gas cylinder logistics system of claim 10, wherein the gas cylinder transfer apparatus further comprises a camera unit mounted on the robot hand and configured to detect the support blocks.

12. The gas cylinder logistics system of claim 10, wherein alignment marks for alignment between the robot hand and the support blocks are respectively disposed on front portions of the support blocks.

13. The gas cylinder logistics system of claim 10, wherein a recognition code in which information of the stage is stored is attached to a front portion of the stage, and a code reader configured to read the recognition code is mounted on the robot hand.

14. The gas cylinder logistics system of claim 10, wherein QR codes in which information of the stage is stored are respectively attached to front portions of the support blocks, and a camera unit for reading the QR codes is mounted on the robot hand.

15. The gas cylinder logistics system of claim 10, wherein the gas cylinder transfer apparatus further comprises distance sensors mounted on the robot hand and configured to measure distances from the support blocks, respectively.

16. The gas cylinder logistics system of claim 10, wherein the gas cylinder transfer apparatus further comprises a tilt sensor mounted on the robot hand and configured to measure a tilt of the support member.

17. The gas cylinder logistics system of claim 8, wherein the hand drive unit comprises:
a first horizontal drive part configured to move the robot hand in a front-rear direction of the transfer vehicle;
a second horizontal drive part mounted on the first horizontal drive part and configured to move the robot hand in a left-right direction of the transfer vehicle;

a vertical drive part mounted on the second horizontal drive part and configured to move the robot hand in a vertical direction; and a tilt drive part mounted on the vertical drive part and configured to adjust an inclination of the robot hand so that an upper portion of the gas cylinder is inclined backward after the gas cylinder is supported on the robot hand.

18. The gas cylinder logistics system of claim 8, wherein the gas cylinder transfer apparatus further comprises a gripper unit configured to grip both side portions of the gas cylinder supported on the robot hand.

19. A gas cylinder logistics system comprising:

a gas cylinder transfer apparatus comprising a transfer vehicle configured to transfer a gas cylinder and a transfer robot disposed on the transfer vehicle;

a control unit configured to control operations of the transfer vehicle and the transfer robot; and a gas cylinder storage apparatus configured to store the gas cylinder transferred by the gas cylinder transfer apparatus, wherein the gas cylinder storage apparatus comprises a stage configured to support the gas cylinder, and the transfer robot comprises a robot hand configured to support a lower surface portion of the gas cylinder, a hand drive unit configured to move the robot hand in horizontal and vertical directions, and a camera unit mounted on the robot hand and configured to detect the stage, wherein the band drive unit comprises:

a tilt drive part configured to adjust an inclination of the robot hand so that an upper portion of the gas cylinder is inclined backward after the gas cylinder is supported on the robot hand, wherein the control unit is further configured to control operations of the tilt drive part, such that, when the gas cylinder is loaded onto a stage or unloaded from the stage, the control unit controls the operations of the tilt drive part so that a support member is in a horizontal state, and wherein a tilt sensor configured to measure a tilt of the support member is mounted on the robot hand, and the control unit is configured to adjust the inclination of the support member based on measurement signals received from the tilt sensor.

\* \* \* \* \*